United States Patent [19]

Gallagher et al.

[11] Patent Number: 5,274,237
[45] Date of Patent: Dec. 28, 1993

[54] DEICING DEVICE FOR CRYOGENICALLY COOLED RADIATION DETECTOR

[75] Inventors: Brian W. Gallagher, Highland Lakes, N.J.; Robert W. Bergensten, Middletown, N.Y.

[73] Assignee: North American Philips Corporation, New York, N.Y.

[21] Appl. No.: 862,084

[22] Filed: Apr. 2, 1992

[51] Int. Cl.$^5$ .............................................. G01T 1/00
[52] U.S. Cl. .............................................. 250/370.15
[58] Field of Search ...................... 250/352, 370.15; 62/51.1, 272

[56] References Cited

U.S. PATENT DOCUMENTS

| | | | |
|---|---|---|---|
| 3,011,057 | 11/1961 | Anger | 250/363.10 |
| 3,746,873 | 7/1973 | Williams | 250/352 |
| 4,474,036 | 10/1984 | Ball et al. | 250/352 X |
| 4,886,240 | 12/1989 | Rich | 250/352 |
| 4,931,650 | 6/1990 | Lowe et al. | 250/397 |
| 4,952,810 | 8/1990 | Gustafson et al. | 250/352 |
| 4,954,708 | 9/1990 | Salzer et al. | 250/352 |
| 4,955,204 | 9/1990 | Pehl et al. | 250/352 X |

FOREIGN PATENT DOCUMENTS 0302716 8/1988 European Pat. Off.

Primary Examiner—Carolyn E. Fields
Assistant Examiner—Edward J. Glick
Attorney, Agent, or Firm—William L. Botjer

[57] ABSTRACT

An X-ray radiation detector is thermally conductively secured to the end of a cryogenically cooled copper cold finger in an evacuated atmosphere. A collimator having a conical radiation conduit at a relatively low evacuated pressure is thermally conductively secured to the end of the cold finger for passing radiation emitted by an electron microscope and reflected from a specimen to the detector in a windowless environment. The collimator and cold finger are at about the same cryogenic temperature. The detector is maintained at a temperature of a few degrees C. above that of the collimator. The collimator conduit radiation ingress aperture is dimensioned to limit gas flow to the conduit to limit moisture flow into the conduit and to the detector, the gas flow being molecular in a low pressure atmosphere. Due to the temperature differential between the detector and collimator, moisture sublimes from the detector to the collimator inside the conduit where the moisture adheres to the collimator as ice providing a relatively ice free detector for long term continuous operation.

21 Claims, 2 Drawing Sheets

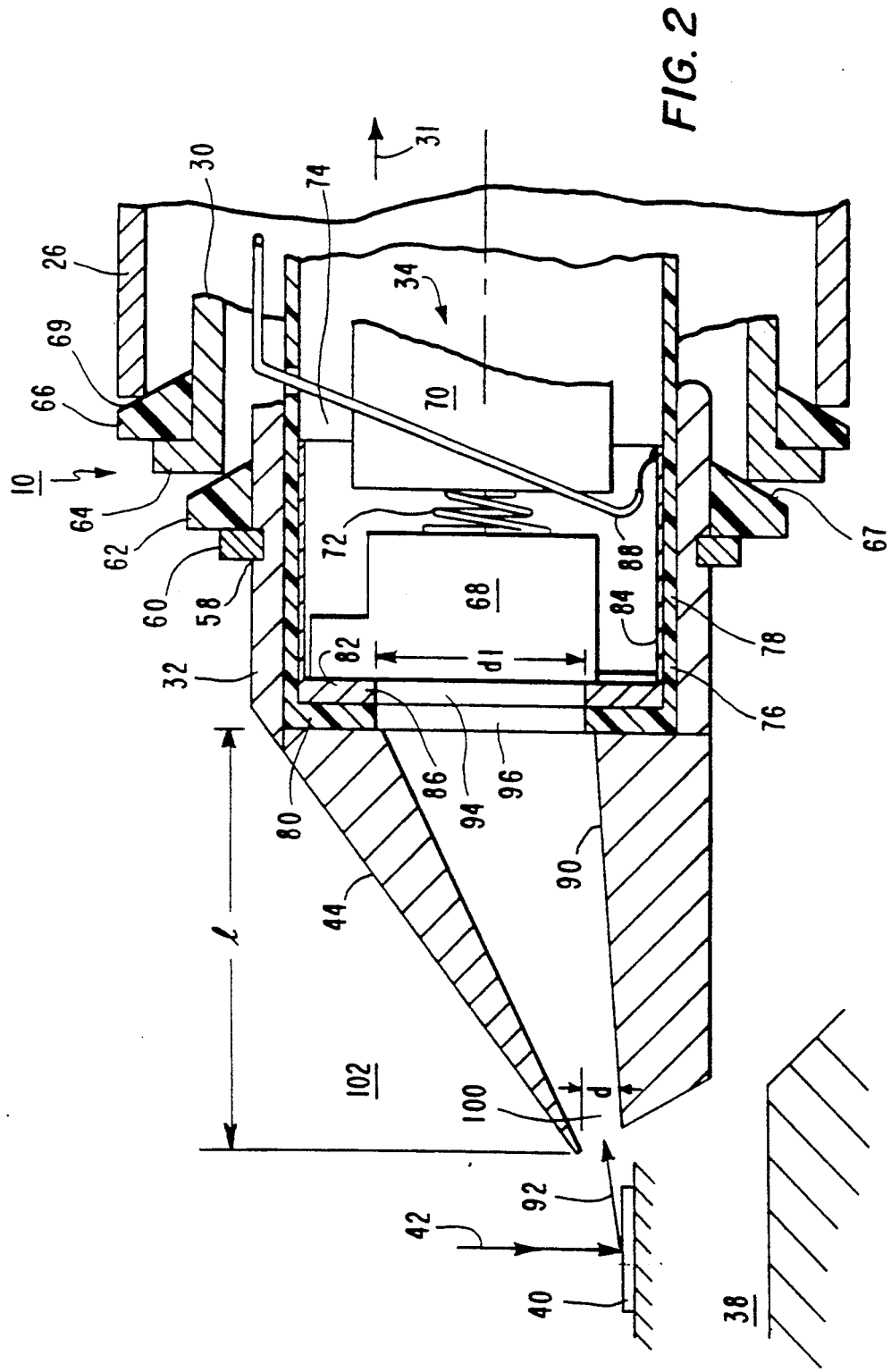

DEICING DEVICE FOR CRYOGENICALLY COOLED RADIATION DETECTOR

BACKGROUND OF THE INVENTION

This invention relates to a device for precluding icing of a cryogenically cooled radiation detector and, more particularly, an X-ray radiation detector operated in a vacuum.

Of interest is commonly owned copending application entitled "Cryogenic Cooling Apparatus for Radiation Detector" Ser. No. 07/862,050 filed concurrently herewith in the name of the present inventors.

Devices for cryogenically cooling radiation detectors are in certain implementations referred to as cold finger assemblies. These assemblies include an elongated finger-like member thermally coupled to a cryogenic Dewar. The Dewar typically is filled with liquid nitrogen for providing cooling of the cold finger in the cold-finger assembly. A radiation detector is thermally conductively attached to an end of the cold finger opposite the cryogenically cooled end. The finger generally is insulated from ambient atmosphere and contained within a housing. The housing may be attached to other systems, for example, in the case of X-ray radiation detection systems, it may be coupled to an electron microscope for windowless X-ray spectroscopic examination of specimens.

In an electron microscope, a cavity of the electron microscope receives a specimen being examined by an electron beam produced by the microscope. The beam incident on the specimen, typically a pencil beam of narrow dimension is incident on the specimen producing X-rays and the resultant X-ray radiation is then radiated from the specimen. The detector is placed within the microscope cavity adjacent to the specimen and detects the radiation radiated from the specimen. The detector converts the radiation to an electrical signal which is passed to an electronic circuit for analysis external the cold finger assembly. The cold finger assembly also includes electronic circuitry for amplifying and sensing the electrical signal produced by the radiation detector.

Some detectors operate in an infrared band and others operate in the X-ray band as discussed above. For example, one such X-ray detector system is disclosed in U.S. Pat. No. 4,931,650. In this environment the known detector comprises a semiconductor mounted at the end of the cold finger or probe introduced into the microscope close to the specimen. The cold finger is surrounded by an envelope and a vacuum is maintained between the finger and the envelope. The cavity in the microscope receiving the cold finger is also at a vacuum. As discussed in this patent, a problem with X-ray detection is that it is sensitive to contamination and, especially, ice buildup. In this patent the prior art is discussed in which the performance of the detector is improved by a warming up procedure. The warming up procedure involves pumping the detector to maintain a vacuum while removing water vapor as it evaporates. Such a procedure is used only as part of a major overhaul involving the return of the detector to the manufacturer. For windowless detectors, a warming up procedure may involve using the pumping system of the microscope. In windowless operation, however, in a spectroscopy type of examination, the microscope cavity and the cold finger may be maintained in an evacuated pressure for many months. Generally prior art systems require that the system be disconnected for a period of time usually every few days or, in some cases, hours, so as to warm up the system and remove the accumulated moisture. The moisture tends to accumulate on the detector decreasing its effectiveness.

As indicated in the aforementioned U.S. Pat. No. 4,931,650, known deicing procedures are time consuming, expensive and may cause contaminated material to be transferred from the detector to the microscope or vice versa during the decontamination procedure. In this patent, conditioning means are provided for locally increasing the temperature of the X-ray detector for a predetermined interval while maintaining a heat sink substantially at the operating temperature and maintaining a physical link in the form of the cold finger between the heat sink and the detector. However, the application of heat, for example by an electrical resistance heater, periodically interrupts the operation of the system and does not remove the problem of ice build up which occurs relatively frequently in terms of long range usage of the microscope system as discussed above.

In U.S. Pat. No. 4,886,240 a non-evacuated Dewar is disclosed which employs a molecular sieve that serves to absorb gases in the Dewar when cooled for operation of a detector to prevent liquid formation onto the detector. A dessicant also may be used to absorb moisture. A Dewar pumping arrangement is disclosed for moisture removal relative to a detector. The detector is secured within the Dewar and includes a lens cap structure. The molecular sieve is employed for removing gases from the area adjacent to the detector when operating. Fluid is contained within the cold finger to expand thereby absorbing thermal energy. The Dewar housing is back filled with inert gas such as nitrogen. This gas is at one atmosphere or atmospheric pressure. However, this system is not disclosed as operating satisfactorily in an evacuated atmosphere especially one in which a microscope is employed in which the microscope emits an electron beam on a specimen to generate X-rays where the specimen needs to be closely spaced to the detector. The use of a lens cap such as disclosed in this patent would not be acceptable in an electron microscope environment. Further, the moisture removing elements might contaminate an evacuated atmosphere.

SUMMARY OF THE INVENTION

A deicing device for a cryogenically cooled radiation detector in accordance with one embodiment of the present invention comprises a radiation detector and means for securing and cryogenically cooling the detector within an evacuated atmosphere. Means are coupled to the means for cooling for substantially precluding ice formation on the secured detector.

The means for precluding in one embodiment includes radiation passing means including means adapted to limit the passage of moisture bearing gas to the detector while passing radiation to the detector. Preferably, the radiation passing means includes thermally conductive means at a cryogenic temperature which when coupled to the means for cooling is cooled thereby to about the cryogenic temperature of the detector. However, the detector is preferably at a temperature greater than the radiation passing means. In one embodiment, the detector is at a temperature of about 5° C. greater than the radiation passing means.

In accordance with a further embodiment, the radiation passing means includes a collimating means having an aperture dimensioned to pass radiation to the detector for limiting the passage of moisture into the aperture. As a result of the dimensions of the aperture, flow of moisture through the aperture is limited. The aperture defines a solid angle as large as possible to maximize radiation incident on the detector while minimizing the aperture size to restrict the amount of moisture that may impinge upon the detector. The radiation passing means is at a lower temperature than the detector such that most of the moisture passing from the ambient region through the radiation passing means to the detector deposits on the radiation passing means as ice rather than reaching the detector.

IN THE DRAWING

FIG. 1 is a somewhat diagrammatic side elevation sectional view of a device constructed in accordance with one embodiment of the present invention; and FIG. 2 is an enlarged cross-sectional side elevation view of the embodiment of FIG. 1.

DESCRIPTION OF THE PREFERRED EMBODIMENT

Figure 1:
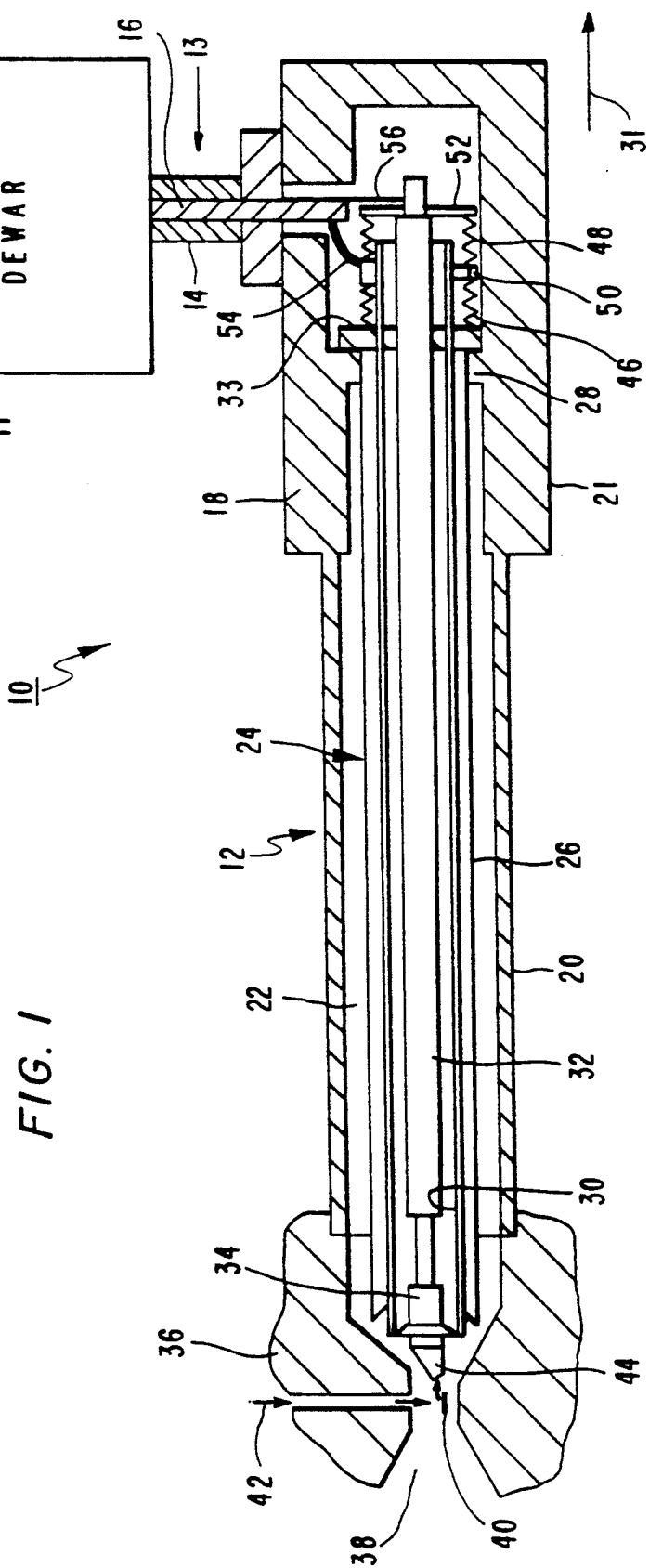

In FIG. 1, cryogenic cooling system 10 comprises a Dewar 11 and an assembly 12 secured to the Dewar 11 via coupling structure 13. The coupling structure 13 includes a support 14 containing an aluminum heat conductor 16 which thermally conductively couples liquid nitrogen (not shown) contained in the Dewar to a portion of the assembly 12 to be cooled. The assembly 12 includes a housing 18 secured to the support 14. The housing 18 comprises an elongated finger-like portion 20 extending from body 21. The housing 18 has an elongated cavity 22. Secured within the cavity 22 is a cold finger assembly 24.

The cold finger assembly 24 comprises an outer circular cylindrical stainless steel tube 26 secured to housing 18 by an annular support 28. By way of example, the support 28 may comprise a clamping arrangement for clamping a flange (not shown) on the end of tube 26. The clamping arrangement preferably comprises a threaded ring (not shown) threaded to housing 18 for clamping the tube 26 flange to the housing 18. The tube 26 is referred to more generally as a warm cap because it is the warmest element of the finger assembly 24. Because it is thermally conductively coupled to the housing 18, it is generally at the temperature of the housing 18.

Concentrically secured within the warm tube 26 is a cold sleeve tube 30. Tube 30 is preferably made of copper and is secured at the detector end in thermally conductive isolation to the warm cap tube 26. Tube 30 is secured within and to housing 18 of body 21 via a thermally conductively insulating disc 33. Disc 33 preferably is a fluorocarbon plastic commercially available as a polychlorotrifluoroethylene or PCTFE. This material is a thermal and electrical insulator and has good machining characteristics. Concentrically mounted within the cold sleeve tube 30 is cold finger 32. Finger 32 is preferably made of copper and is supported within tube 30 and tube 26 at its opposing ends. Finger 32 is supported at the detector end to the cold sleeve tube 30 via a ring of PCTFE. The end of tube 30 at this location is supported by tube 26 via a second ring of PCTFE. This structure will be shown in more detail and explained below in connection with FIG. 2. The other end of the cold finger 32 is secured by disc 33 to housing 18 in thermal conductive isolation to the housing.

A radiation detector assembly 34 is thermally conductively secured to the end of tube 32 extending from housing 18 for windowless detecting X-ray radiation radiated from the specimen, only a portion of microscope 36 being shown for purposes of illustrating the principles of the present invention. The microscope 36 has an evacuated chamber 38, for example, $1 \times 10^{-7}$ Torr. A specimen 40 is located within chamber 38 and is located to receive electron beam 42 of the microscope 36. The beam 42 is incident on the specimen 40 and, in response X-rays 92 (FIG. 2) radiated from the specimen are radiated to the detector assembly 34 via collimator 44 which serves to deice the detector of assembly 34 in a manner to be described more fully. The drawing in FIG. 1 is somewhat schematic in that the cavity 22 is illustrated evacuated throughout, but in practice may be separated between the chamber of the microscope 36 and that within housing 18 by a bellows construction (not shown).

The spring assembly comprises compression springs 46 and 48. Spring 46 urges tube 30 in the direction 31 at the detector end of the assembly in engagement with the detector end of warm tube 26 (fixed at its other end to housing 18 via support 28). Spring 48 urges cold finger 32 in engagement with tube 30 at the detector end of the assembly also in direction 31. Springs 46 and 48 are schematically shown, but encircle the cold sleeve tube 30. Spring 46 abuts the disc 33 and an annular ridge 50 secured to tube 30 within body 21. Spring 48 is compressively engaged between ridge 50 and structure 52 attached to the end of the cold finger 32. These elements are shown in more detail in the aforementioned copending application incorporated by reference herein. A copper braided strap 54 thermally conductively couples conductor 16 to ridge 50 attached to tube 30. A second braided copper thermally conductive strap 56 is thermally conductively connected to conductor 16 and to cold finger 32. The straps 54 and 56 are soldered to and at the end of the tube and cold finger opposite the detector end. The tube 30 and cold finger 32 are mounted so as to axially displace relative to tube 26 in the direction 31 in response to temperature cycling by structure not shown herein.

The conductor 16 via the straps 54 and 56 maintains the end of cold finger 32 and cold sleeve tube 30 attached thereto at about 87° K. in this embodiment. The facing surfaces of finger 32, tubes 30 and 26 are specular. Due to the specular surfaces and by providing minimum spacing of the tubes with respect to each other, the cold finger 32 is also at about 87° K. at the detector assembly 34 end. The cold sleeve tube 30 may be at about 130° to 140° K. at the detector assembly 34 end. The warm tube 26 is at ambient temperature. Collimator 44 is soldered to the cold finger 32 adjacent to the detector assembly 34 and is also at the same temperature as the cold finger 32, for example, 87° K.

In FIG. 2, the collimator end of the assembly 12 is shown in more detail. In this figure, cold finger 32 has a groove 58 for receiving a retaining ring 60. A ring 62, made of PCTFE, has a tapered surface 67 and is secured by ring 60 about cold finger 32 to preclude displacement in a direction opposite direction 31. The cold sleeve 30 has an upstanding annular flange 64 which abuts the tapered surface 67 of ring 62. A second ring 66 of PCTFE is secured by flange 64 from displacement in a direction opposite direction 31. The ring 66 is secured about tube 30. Tube 26 at its detector end abuts ring 66 tapered surface 69.

It will be recalled that the tube 26 is rigidly secured cantilevered to the housing 18 (FIG. 1) via support 28. The spring 46 resiliently urges tube 30 in direction 31 forcing it in abutting engagement via the tapered surface of ring 66 with tube 26. In turn, the cold finger 32 is forced also in direction 31 by spring 48. Tube 32 is in abutting engagement with the tube 30 via the tapered surface 67 of ring 62. Thus the cold finger 32 and tube 30 are held cantilevered in place by the rings 62 and 66 and the resultant forces created by the springs in direction 31. PCTFE material provides electrical and thermal conductive isolation between the tube 26 and tube 30 and between the tube 30 and cold finger 32. This arrangement keeps finger 32 substantially at 87° K. along its length although there may be a 1° C. temperature gradient therealong.

The detector assembly 34 comprises a crystal X-ray detector 68 and a field effect transistor (FET) 70 which is electrically ohmically and mechanically coupled to the detector 68 by spring 72. Spring 72 resiliently holds detector 68 in place. FET 70 is secured in place by a support 74 secured to the cold finger 32 via a PCTFE sleeve 76. The FET 70 is coupled to other elements of an electronic circuit (not shown) including a resistive heater, several diodes and FET amplifier circuits among other circuit elements. The sleeve 76 has a tubular portion 78 and a front washer portion 80. A bias voltage is provided to the detector 68 via an electrically conductive sleeve 82 nested within sleeve 76 and having a tubular portion 84 and a washer portion 86. A wire conductor 88 couples the sleeve 84 to a source of bias voltage (not shown) for biasing detector 68. The sleeve 76 tubular portion 78 is relatively thin for example 0.075 millimeters thick. This relatively thin tubular portion provides substantial thermal conductive relation between the detector 68 via conductor sleeve 82 and the cold finger 32. The washer portion 80 of sleeve 76 is also relatively thin for example 0.25 millimeters thick. This is to permit substantial thermal conductive relation between the detector 68 via the washer portion 86 of conductive sleeve 82 and collimator 44 even though sleeve 76 is a thermal insulator. Collimator 44 is soldered to the end of cold finger 32 as shown. Collimator 44 is preferably made of copper as mentioned above so as to provide good thermal conductivity to finger 32.

Collimator 44 is a somewhat conical member having a conical conduit 90 for passing X-ray radiation 92 from specimen 40 in a solid angle to the detector 68. The radiation 92 is passed through conduit 90 and apertures 94 of sleeve 76 and 96 of sleeve 80 in the respective washer portions thereof. The dimension d1 of apertures 94 and 96 is about the same, comprises the active detector 68 radiation sensitive area and is circular. The diameter d1 is in one implementation about 6 millimeters but could be other sizes in other implementators.

The relation between diameters d and d1 is critical in that they define the solid angle of the radiation incident on the detector 68. The area of collimator 44 radiation ingress aperture 100 relative to the area of radiation egress apertures 94 and 96 is at most one-half and preferably one-fourth. The reason for making aperture 100 as small as possible is to limit the flow of gas into conduit 90 from the ambient region 102 outside the collimator 44 within the evacuated chamber 38 of the microscope 36. By making the aperture 100 relatively small the gas flow from region 102 into the conduit 90 is limited, because at low pressure the flow is not laminar, but molecular. What this means is that although there may be a pressure differential such that the pressure within the conduit 90 is lower than in region 102, gas flow is not influenced by that pressure differential. For example, the pressure in conduit 90 may be about $1 \times 10^{-8}$ torr while the pressure in external evacuated region 102 may be about $1 \times 10^{-7}$ torr. This pressure differential does not cause gas to flow from region 102 into the conduit 90. Rather the molecules of gas in region 102 due to their motion randomly enter the conduit 90 only if they happen to be moving in a straight line toward and into the aperture 100 due to their molecular action. As a result, the amount of gas that flows through the aperture 100 is kept to a minimum due to the fact that statistically fewer molecules of gas enter the conduit 90 by molecular flow rather than by laminar flow. By making aperture 100 small, this molecular flow is restricted.

The collimator 44 being thermally conductively connected to the cold finger 32 is at the same temperature as cold finger 32 and, particularly, 87° kelvin. However, the detector 68 is slightly warmer than this temperature. The electronic circuitry including FET transistor 70 and other elements described above are coupled to detector 68 via the spring 72 which serves several functions. The spring 72 is metal which provides thermal conductive connection between the field effect transistor 70 and the detector 68 as well as electrical and mechanical connection. The circuitry including the field effect transistor 70 serves as a heat source which raises the temperature of the detector 68 via spring 72 to a temperature somewhat above that of collimator 44 and cold finger 32. The temperature of detector 68 preferably is about 5° C. above that of collimator 44 and in this case, for example, is at about 92° kelvin. This temperature differential is also critical with respect to deicing the face of detector 68 facing apertures 94, 96 and conduit 90 receiving the X-ray radiation 92.

By making the flow of gas into conduit 90 of the collimator 44 a minimum and making the collimator at a lower temperature than the detector 68, a significant amount of moisture in that gas in conduit 90 tends to adhere to the wall of conduit 90. Any ice that forms on the face of detector 68 in communication with apertures 94 and 96 tends to sublime from the detector and flow to the conduit 90 wall. The reason for this sublimation is due to the fact that the vapor pressure of the water molecules on the surface of the detector is greater than the partial pressure of the water molecules in the surrounding gas. The reason for this is that the colder surface of the collimator drops the partial pressure of the water in gaseous form (water vapor) inside the collimator conduit 90. This traps the water onto the colder collimator surface.

The diameter d of the aperture 100 of the collimator 44 is critical in that making the diameter too small insufficient radiation 92 will enter the conduit 90. It is important that the amount of radiation incident on the detector be maximized. This entails making the solid angle from the specimen to the detector as great as possible. This is done by placing the detector as close as possible to the specimen. By making the diameter d larger, however, the flow of gas from region 102 would undesirably increase. Tests have shown by making the diameter d somewhat greater than that described sufficiently more gas flows into conduit 90 so as to increase the icing of the detector 68 face. Such tests are performed in that ice blocks light element X-rays (less than 1 kV) by absorbing spectra of a specimen, i.e., iron or copper, with respect to X-ray radiation. By impinging the electron beam 42 on a specimen 40 of a known spectrum and observing that spectrum produced by detector 68 on a test apparatus, the observation of ice build up on the detector 68 can be observed by observing the ratio of higher energy element spectra lines to lower energy spectra lines (less than 1 kV). When the ice builds up, the ratio of higher energy to lower energy will increase and the amount of ice can be estimated.

A second critical factor is the relative temperature of detector 68 with that of the collimator 44. By making the temperature differential less than 5° C. for example, about 2° C. ice build up on the detector 68 was also observed. However, as is known, the detector 68 crystal material is one which operates most efficiently at the lowest possible cryogenic temperature. Raising the temperature of detector 68 decreases it effectiveness. Therefore, the temperature of operation of the detector 68 is a compromise of decreased effectiveness as the temperature is raised with respect to energy resolution of the detection X-rays and increased effectiveness with respect to deicing the radiation detecting face of detector 68. It has been observed by experimentation that a 5° C. differential between the detector 68 and the collimator 44 is optimum between these opposing requirements for the sizes of the apertures employed. Thus, the circuitry of assembly 34 which includes the heater resistance (not shown) is designed to provide that heat input to the detector 68 to maintain the detector 68 at the approximate 5° C. temperature differential with that of the cooler collimator 44. Of course, with different detectors having different operating characteristics, the temperature differential may differ accordingly.

The inner surface of the conduit 90 is a smooth cone. The reason for this is so that the radiation 92 passing through the conduit 90 has a relatively small angle of incidence with respect to the surface of conduit 90. This small angle of incidence precludes the radiation reacting with the conduit 90 which flouresce characteristic X-rays of the collimator material (copper) which fluorescence would interfere with the analysis of the X-ray radiation 92 from the specimen 40. Thus, the conduit 90 is not only conical, but also has a smooth wall so as to prevent scattered fluorescent from being produced by the radiation 92 as it passes through the conduit 90. This ensures the purity of the radiation 92 incident on the detector 68 to further ensure accuracy of the spectrum manifested by the radiation 92.

The length 1 of the collimator is such as to provide the desired solid angle size of the conduit 90 sufficient to pass radiation to the detector 68 at the cold finger end of the collimator and to provide the desired minimum aperture 100 dimensions as discussed above, while permitting the collimator to be placed as close as possible to the specimen 40. The spacing of the collimator 44 to the specimen 40 is limited by the microscope 36 structure itself which has an additional tube structure (not shown) which limits the spacing of the end of collimator 44 to the specimen 40. By way of example, the area of the crystal 68 for receiving the radiation 92 may be about 30 square millimeters whereas the area of aperture 100 may amount to 10 square millimeters. These dimensions also may differ in accordance with a given implementation as well as the temperatures given by way of example.

In attempts to ice the detector 68 in an evaluation of the performance of the device described above, excess moisture was inserted into the microscope 36 cavity 38. No significant icing was observed on the detector 68 face. It is believed that as a result of the automatic deicing operation described above the shut down of the system for the express purposes of deicing the detector 68 is no longer necessary as compared to prior art systems. Therefore, this system can operate for an unlimited time without shut down for deicing the detector. This is important in terms of efficiency and accuracy of testing. In the embodiment illustrated, the crystal 68 may be about 13 millimeters from the center line of the incident beam 42 and the sample 40. The radiation 92 is radiated in all directions and captured by the detector crystal on its active area over a solid angle, for example, 0.13 steradian. Therefore, it is essential that the detector 68 be placed in such a position so as to obtain an acceptable solid angle of the radiation 92 radiated from the specimen 40. At half the angle of the cone of radiation 92 as described above, additional X-rays characteristic of the collimator 44 material might be emitted. Secondary fluorescent drops dramatically with a relatively low angle of incidence. However, the secondary fluorescent is not a problem in all implementations. For example, in an infrared system such fluorescence is not believed to be a problem and a smoothed wall tapered conduit 90 could therefore be less significant.

The dimensions of the collimator 44 are important only to the extent the collimator fits within the cavity in connection with the particular microscope or other apparatus being used. The smaller the aperture 100 of course the better with respect to minimizing gas flow carrying moisture into the cavity 90. The limitations on the diameter and size of aperture 100 is that for maximizing the penetration of radiation 92 into the cavity 90, i.e., its solid angle, for incidence on the detector 68. The thickness of the collimator 44 between the conduit 90 and the exterior region 102 is not important. As a result of the arrangement described, any moisture that may be present within the region 102 that enters the conduit 90 tends to adhere to the collimator 44 rather than the detector 68 and any such ice that does form on the detector 68 eventually sublimes to the surface of conduit 90.

Below a pressure of $1 \times 10^{-3}$ torr a residual gas does not behave in a laminar flow manner. More particularly, it is the mean free path which determines the flow, which mean free path is relatively long. Each molecule of a gas moves in a straight line until it hits an object. The only material that enters the aperture 100 therefore is that material that travels in a straight line toward the relatively small aperture 100. Based on the pressure differentials, the aperture sizes and temperature differentials, a pumping equilibrium is set up between the conduit 90 and the external region 102. Based on the volume of gas, temperatures, and partial pressure of the residual gases in the conduit 90, the moisture leaving the surface of the detector 68 pumps from the detector to the collimator based on the parameters given. Therefore any ice build up on the detector 68 leaves the detector relatively quickly, for example, in a matter of minutes and any ice build up on the detector 68 is therefore precluded. The various parameters including the relative temperatures of the collimator 44, the detector 68 and size of apertures as well as pressure differentials within the collimator conduit 90 and external region can be determined empirically. By empirical evaluation with a temperature differential of about 3° C. between the collimator 44 and detector 68, the system appeared to work reasonably well. However, more consistent deicing performance was obtained with a 5° C. temperature differential at 87° K. for the collimator and 92° K. for the detector.

By keeping the aperture 100 of the collimator 44 as close as possible to the X-ray source, for example to the specimen, the detector crystal 68 solid angle (active area of the crystal illuminated by the X-ray source) can be maximized while minimizing the size of the aperture 100. An additional benefit to the relatively small aperture 100 is reduction in radiated heat input to the detector crystal 68. While the pressure given above with respect to the conduit 90 in external region 102 has been given as about $1 \times 10^{-7}$ torr, molecular flow starts approximately at a pressure of about $1 \times 10^{-3}$ torr. As long as less than $1 \times 10^{-3}$ torr is maintained, then the molecular flow of gases will be the active way of flowing as compared to laminar flow. Because of restriction of the aperture 100 and the range of pressures involved, particles are more likely to sublime from the surface of the detector 68 and be captured by the collimator 44, than impact on the detector 68 face. The result is that the detector 68 surface does not contaminate. This allows unlimited windowless operation in a vacuum environment with excellent sensitivity to low energy X-rays. The advantage of this is that introduction of wet or dirty specimens does not require long pumping of a specimen before windowless analysis can be started. Operation of an apparatus in accordance with one embodiment of the present invention showed that ice and contaminate free performance can be provided in a relatively poor vacuum environment such as for example $1 \times 10^{-4}$ torr. The present invention may be operated with any cooled device which is operated in a vacuum where the surface of the device must be kept free of contaminants or ice. In comparison, prior art devices require extremely long pumping time typically overnight on a specimen before windowless analysis can commence or raise the detector to a relatively high temperature to remove the ice requiring the detector to be shut off.

What is claimed is:

1. A cryogenically cooled X-ray radiation detection device comprising:
   an X-ray radiant detector;
   a cooling means for cryogenically cooling said detector within an evacuated atmosphere; and
   radiation collimating means thermally coupled to said cooling means for passing radiation to said detector and defining a solid angle of radiation, said collimating means includes a conduit having first and second apertures, said first aperture being disposed proximate said detector and having a cross sectional area at least twice that of said second aperture, said collimating means dimensioned so as to substantially preclude ice formation on said detector.

2. The device of claim 1, wherein said cooling means includes an elongated thermally conductive member thermally coupled at one end to a cryogenic cooling source and at the other end to said detector and said collimating means.

3. The device of claim 2, wherein said collimating means is thermally conductive and cooled to about the temperature of said detector.

4. The device of claim 3, wherein said collimating means is cooled to a temperature less than that of said detector.

5. The device of claim 4, wherein said collimating means has a temperature of at least 5° C. lower than said detector.

6. The device of claim 1, wherein said conduit has a substantially smooth wall for maximizing radiation passage therethrough.

7. The device of claim 1, wherein said first aperture has a diameter of about 6 mm and said second aperture has a diameter of about 1.5 mm.

8. The device of claim 1, wherein said collimating means comprises a hollow metal members, said cooling means comprises an elongated thermally conductive member thermally coupled at one end to a cryogenic cooling source and at the other end to said detector and said hollow metal member.

9. The device of claim 8, wherein said hollow metal member defines a cavity, said cavity having a pressure lower than the pressure in the ambient region external said hollow metal member, said cavity being in gaseous communication with said ambient region, said ambient region being at a reduced pressure relative to ambient atmosphere.

10. The device of claim 8, further including means for heating said detector to a temperature above the temperature of said hollow metal member.

11. The device of claim 10, wherein said means for heating includes means for electrically sensing an output signal of said detector.

12. The device of claim 10, wherein said detector is at about 92° K. and said hollow metal member is at about 87° K.

13. A cryogenically cooled X-ray radiation detection device comprising:
   an elongated thermally conductive member thermally coupled at one end to a cryogenic cooling source and at the other end to an X-ray radiation detector;
   a collimator thermally conductively secured to said other end so as to be substantially at the same temperature as said other end, said collimator having a conduit defined by a first and second aperture, said first aperture being disposed adjacent said detector and having substantially the same size as the active area of said detector and a cross sectional area at least twice that of said second aperture, said second aperture spaced from said first aperture so as to receive and transmit radiation of a given solid angle to said other end while limiting moisture laden gas from entering said second aperture; and
   means for maintaining the temperature of said collimator relative to the temperature of said detector so as to collect moisture in the form of ice on said collimator while precluding the substantial collection of moisture in the form of ice on said detector.

14. The device of claim 13, wherein said member is a hollow copper tube and said collimator is at about the same temperature as said hollow copper tube and at a lower temperature than said detector.

15. The device of claim 14, wherein said detector generates a signal in response to incident radiation, said device including circuit means coupled to said detector and responsive to said signal for amplifying said signal and for increasing the temperature of said detector relative to said collimator.

16. The device of claim 15, further including an electron microscope including electron beam generating means for causing an object under examination to generate X-rays, said object in response to said electron beam generating said X-rays which manifest a characteristic of said object, the generated X-rays being received and passed by said collimator to said detector.

17. The device of claim 16, wherein said collimator is copper and is soldered to said hollow copper tube.

18. The device of claim 13, wherein said first aperture is about 6 mm in diameter and said second aperture is about 1.5 mm in diameter.

19. A cryogenically cooled X-ray detector structure for an electron microscope having an evacuated examination chamber comprising:
   a housing;
   a cold finger within said housing;
   a cooling means coupled to said housing for cooling said cold finger to a cryogenic temperature;
   an X-ray radiation detector secured to an end of said cold finger;
   a collimator secured to said cold finger adjacent to said detector for passing X-ray radiation incident thereon from said examination chamber to said detector, said collimator being adapted to prevent the accumulation of ice on said detector, said collimator being generally conical and having a first aperture proximate said detector and a second aperture distal from said detector, said first aperture having an area of at least twice that of said second aperture; and
   a means for securing said collimator within said examination chamber.

20. The structure of claim 19, wherein said collimator has a radiation transmission conduit defined by a wall for passing radiation from said examination chamber to said detector, said conduit defined by a wall having a temperature lower than that of said detector and dimensioned so as to cause moisture within said collimator to accumulate on said wall.

21. The structure of claim 20, wherein said conduit having a wall is further dimensioned so as to minimize moisture laden gas from flowing therein regardless the pressure differential between the pressure within said collimator and the pressure of the ambient region external said collimator.

* * * * *